United States Patent
Enyedi et al.

(10) Patent No.: US 8,780,696 B2
(45) Date of Patent: Jul. 15, 2014

(54) SYSTEM AND METHOD OF IMPLEMENTING LIGHTWEIGHT NOT-VIA IP FAST REROUTES IN A TELECOMMUNICATIONS NETWORK

(75) Inventors: Gabor Enyedi, Bekescsaba (HU); András Császár, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 445 days.

(21) Appl. No.: 13/129,694

(22) PCT Filed: Nov. 16, 2009

(86) PCT No.: PCT/IB2009/007467
§ 371 (c)(1),
(2), (4) Date: Oct. 13, 2011

(87) PCT Pub. No.: WO2010/055408
PCT Pub. Date: May 20, 2010

(65) Prior Publication Data
US 2012/0039164 A1 Feb. 16, 2012

Related U.S. Application Data

(60) Provisional application No. 61/115,408, filed on Nov. 17, 2008.

(51) Int. Cl.
*H04L 12/26* (2006.01)
(52) U.S. Cl.
USPC .......................................................... 370/217
(58) Field of Classification Search
USPC .......................................................... 370/217
See application file for complete search history.

(56) References Cited

U.S. PATENT DOCUMENTS

| 7,480,239 | B1 * | 1/2009 | Sundaresan et al. | 370/230 |
| 7,990,946 | B2 * | 8/2011 | Deguchi | 370/351 |
| 2002/0118641 | A1 * | 8/2002 | Kobayashi | 370/230 |
| 2003/0185148 | A1 * | 10/2003 | Shinomiya et al. | 370/216 |
| 2007/0165657 | A1 * | 7/2007 | Smith et al. | 370/401 |
| 2008/0049609 | A1 * | 2/2008 | Chao et al. | 370/218 |
| 2009/0046587 | A1 * | 2/2009 | Kothari et al. | 370/238 |

(Continued)

OTHER PUBLICATIONS

Routing Area Working Group, Basic Specification for IP Fast Reroute : Loop free Alternates draft-ietf-rtgwg-ipfrr-spec-base-12, Mar. 27, 2008.*

*Primary Examiner* — Brandon Renner
*Assistant Examiner* — Faisal Choudhury

(57) ABSTRACT

A system, method, and node for implementing lightweight Not-via Internet Protocol fast reroutes of a packet in a telecommunications network between a first node and a destination node. The method determines a shortest path between the first node and the destination node and two redundant trees between the first node and the destination node. Each redundant tree provides an alternate path from the first node and the destination node. When a failure in a link between the first node and the destination node is detected, the packet is forwarded to the destination node via a first redundant tree, and if not available, via a second redundant tree. If the second redundant tree is not available, the packet is dropped. If no failure in the link between the first node and the destination node is detected, the packet is sent via the determined shortest path to the destination node.

6 Claims, 4 Drawing Sheets

(56) References Cited

U.S. PATENT DOCUMENTS

2009/0207728 A1* 8/2009 Bryant et al. ............... 370/225
2011/0173486 A1* 7/2011 Yagyu ........................... 714/2
2011/0292838 A1* 12/2011 Chiabaut et al. ............ 370/256

* cited by examiner

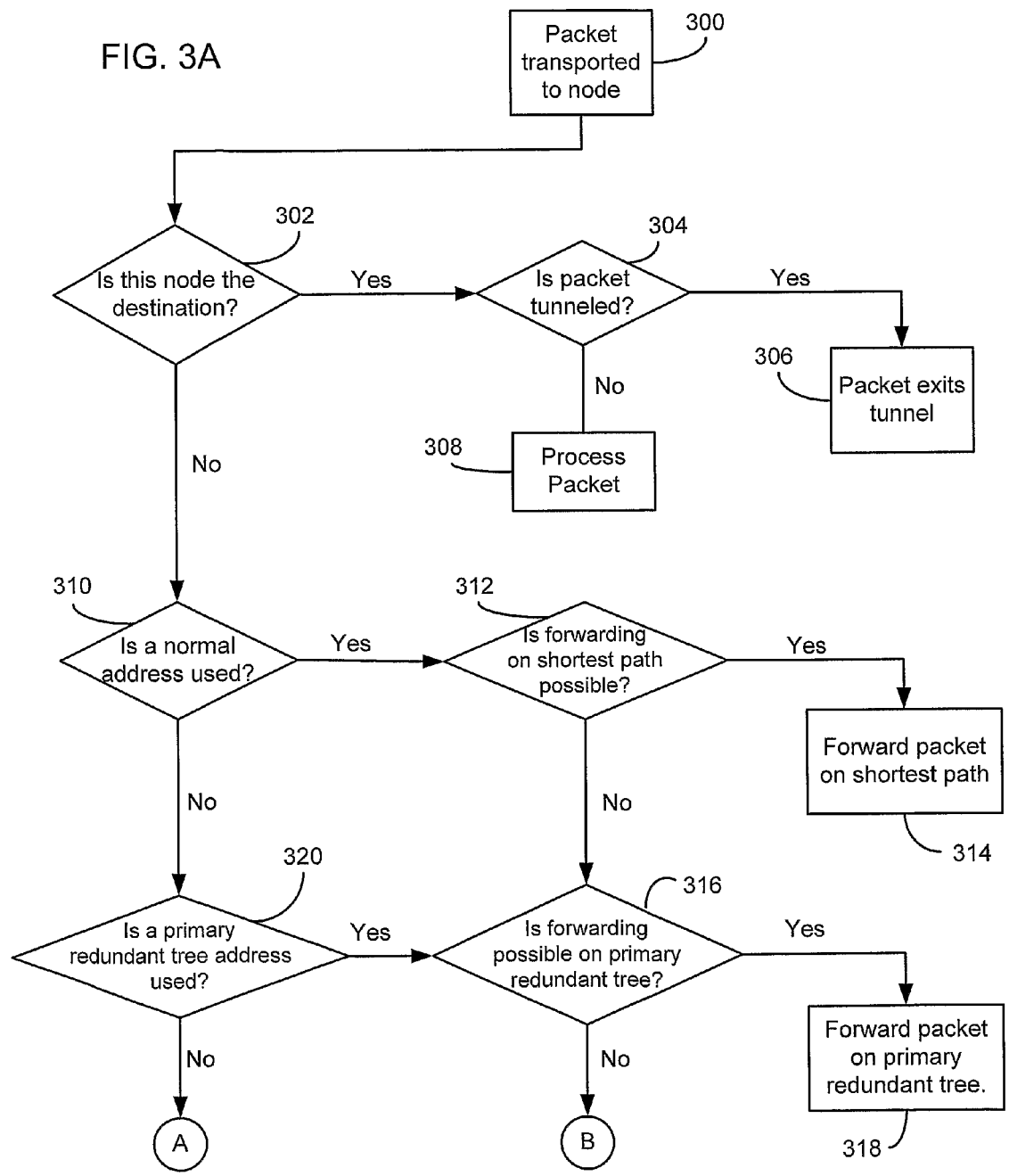

SYSTEM AND METHOD OF IMPLEMENTING LIGHTWEIGHT NOT-VIA IP FAST REROUTES IN A TELECOMMUNICATIONS NETWORK

This application claims the benefit of U.S. Provisional Application No. 61/115,408, filed Nov. 17, 2008, the disclosure of which is fully incorporated herein by reference.

TECHNICAL FIELD

The present invention relates generally to communications networks, and in particular, to a system and method of implementing lightweight Not-Via IP fast reroutes in a telecommunications network.

BACKGROUND

When using the traditional resilience methods in Internet Protocol (IP) networks, the re-routing of traffic around a failure can take a significant time. A primary reason for this slow reconfiguration is the reactive approach offered by conventional routing protocols, such as Open Shortest Path First (OSPF) or the Intermediate System-to-Intermediate System (IS-IS) routing protocol, which are widely deployed in modern IP networks. With existing protocols, fault recovery is assured by propagating the information about the failure in the network and re-computing the routing tables at each router. This is accomplished after a failure exists which increases the time necessary for re-routing a packet.

In contrast to traditional IP error correction techniques, which are fundamentally reactive, the new IP Fast Reroute (IPFRR) framework standardized in the Routing working group of Internet Engineering Task Force (IETF) proposes proactive solutions. Thus, these methods are always ready to reroute packets. However, the reroute must be conducted locally through algorithms because there is no time for any communication. By using these algorithms, transient link errors may also be avoided. Since packets can reach the destination, the starting of the reconfiguration of the network can be delayed until the failure is verified.

Among the IPFRR techniques, methods using Not-via addresses are important in accomplishing re-routes. These methods use simple IP-in-IP tunnels to avoid a single failed resource, which is an inexpensive operation in current routers. The resource may be either a node or a link. If there is more than one failure, packets may not reach the destination. In such a situation, packets may be dropped, thereby preventing the formation of a loop.

Two redundant trees may be directed at spanning trees rooted at an arbitrary given node (root node) in such a way that there is a path from each node to the root on both trees. These paths are 'node-disjointed' to provide separate paths utilizing different nodes. Redundant trees can always be found, even in linear time, if the network is two-node connected. Thus, these trees may be used for resilience if the destination is the root node. Furthermore, if the graph used in defining the pathways of the packet is not two-node connected, two directed trees may be found in such a way that the two paths from any of the nodes to the root are maximally node and edge disjointed. These trees are known as maximally redundant trees and may also be found in linear time by a simple modification of the algorithm finding redundant trees. If a network is two-node-connected, perfect redundancy can be achieved since maximally redundant trees are also redundant trees. Furthermore, it is also possible to compute the next hops of two redundant trees. The necessary parts of the trees for resilience are rooted at each node as a root in linear time.

However, there are problems with the existing methods. The rerouting time of conventional routing protocols is too long. Studies have shown that using OSPF or IS-IS, rerouting time can take numerous seconds or longer in extreme cases. Gigabytes of data may be lost during this time period. Additionally, users of applications or the applications themselves may even lose their sessions. Obviously, for real time traffic, such as Internet Protocol Television (IPTV) or Voice over IP (VoIP), this slow response is even more undesirable.

The greatest problem of the simplest IPFRR techniques is that they can correct failures only in special cases (e.g., when multiple equal cost shortest paths (like in ECMP) or multiple loop free alternate paths exist to the destination).

Currently, there are only two IPFRR methods which can provide one hundred percent link fault recovery, Failure Insensitive Routing (FIR) and Not-via Addresses. However, neither of these techniques can always provide fast resilience when more than one failure occurs simultaneously.

The original FIR is prone to create loops when more than one link or, at least one node has failed. A loop is a forwarding cycle which is never left by packets. Packets are dropped when Time-To-Live (TTL) is up. There is a solution which can avoid these loops. However, when the loops are avoided, the paths used when no failure exists must generally be longer then the shortest paths.

The existing Not-via addresses also suffers from some disadvantages. Although Not-via Addresses uses the shortest paths when no failures are present, numerous IP addresses are used in order to avoid a failed resource if necessary. In such circumstances, the number of IP addresses scales quadratically. This high number of IP addresses raises the problem of managing these addresses. Furthermore, utilizing a Not-via method also increases the computational complexity. This method needs numerous shortest path computations. Thus, the time needed to download the computed routings to the line cards of the routers is also increased because of the high number of addresses. Additionally, a Not-via method utilizes several special cases, thereby making it difficult to debug and implement.

SUMMARY

The present invention is a modification of the existing Not-via address solution. Instead of computing several shortest path trees, the present invention determines a pair of redundant trees (the primary and the secondary trees) for each node as a root. Furthermore, the present invention determines a shortest path in the network where no failure exists. If a packet cannot be forwarded on the shortest path, the packet is placed in an IP-in-IP tunnel and is forwarded to the next-next hop along the primary redundant tree. If a node cannot forward the packet on the primary tree, the packet is forwarded on the secondary tree.

Thus, in one embodiment, the present invention is directed to a method of implementing lightweight Not-via Internet Protocol fast reroutes of a packet in a telecommunications network between a first node and a destination node. The method includes the steps of determining a shortest path between the first node and the destination node and determining first and second redundant trees between the first node and the destination node. Each redundant tree provides an alternate path from the first node and the destination node. When a failure in a link exists between the first node and the destination node is detected, the packet is forwarded to the destination node via the first redundant tree if the first redundant tree is available. If the first redundant tree is not available, the packet is forwarded to the destination node via the second redundant tree if the second redundant tree is available. If the second redundant tree is not available, the packet is dropped. If no failure in the link between the first node and the destination node is detected, the packet is sent via the determined shortest path to the destination node.

In another embodiment, the present invention is directed to a system for implementing lightweight Not-via Internet Protocol fast reroutes of a packet in a telecommunications network. The system includes a first node transmitting a packet and a destination node for receiving the packet. The first node determines a shortest path between the first node and the destination node and also determines first and second redundant trees between the first node and the destination node. The redundant trees provide alternate paths from the first node and the destination node. The first node determines if a failure in a link exists between the first node and the destination node and, upon determining a failure exists between the first node and the destination node, forwards the packet via the first redundant tree to the destination node. If the first redundant tree is not available, the packet is forwarded to the destination node via the second redundant tree if the second redundant tree is available. If the second redundant tree is not available, the packet is dropped. If no failure in the link between the first node and the destination node is detected, the packet is sent via the determined shortest path to the destination node.

In still another embodiment, the present invention is directed to a node for implementing lightweight Not-via Internet Protocol fast reroutes of a packet in a telecommunications network from the node to a destination node. The node determines a shortest path between the node and the destination node and determines first and second redundant trees between the node and the destination node. The redundant trees provide alternate paths between the node and the destination node. The node also determines if a failure in a link exists between the first node and the destination node and, upon determining a failure exists between the first node and the destination node, forwards the packet via the first redundant tree to the destination node. If the first redundant tree is not available, the packet is forwarded to the destination node via the second redundant tree if the second redundant tree is available. If the second redundant tree is not available, the packet is dropped. If no failure in the link between the first node and the destination node is detected, the packet is sent via the determined shortest path to the destination node.

BRIEF DESCRIPTION OF THE DRAWINGS

FIGS. 3A and 3B are flowcharts illustrating the steps of forwarding a packet where a node or link failure occurs in a network according to the teachings of the present invention.

DETAILED DESCRIPTION

The present invention is a system and method of implementing lightweight Not-Via IP Fast Reroutes in a telecommunications network. The present invention is a modification of the existing Not-via address solution. In the present invention, tunnelling is utilized to send packets on a detour. In a similar manner as the existing Not-via address solution, tunnelling is accomplished by using special IP addresses (e.g., private address such as 10.0.0.0/24). However, in the present invention, significantly less IP addresses are needed, thereby lowering computational complexity of the system.

In the present invention, rather than computing several shortest path trees, a pair of redundant trees (the primary and the secondary trees) is computed for each node as a root. Additionally, one shortest path in the network with no failures is also computed. In a similar manner as existing Not-via solutions, the default path for a packet is the shortest path. If a packet cannot be forwarded on the shortest path, an IP-in-IP tunnel is implemented. However, unlike the existing Not-via address solution, the packet is forwarded to the next-next hop along the primary redundant tree. If a router or node cannot forward the packet on the primary tree, the packet is forwarded on the secondary tree. If the packet reaches the next-next hop, the tunnel remains intact and the packets follow the shortest path as usual.

Thus, the packet can reach the destination if a single node or link fails since one of the redundant trees remains untouched by the failure. In the present invention, a node only needs three IP addresses. The present invention may be scaled linearly with any number of nodes. In a general network, where all the interfaces have their own addresses, no extra IP address is necessary. In addition, three IP addresses per node is the minimum reachable by the original Not-via addresses. However, in an illustrated embodiment, the present invention is implemented in point-to-point networks with ring topology. Computing the next hops of redundant trees may be accomplished in linear time so the computational complexity of the present invention is equal to the complexity of a single Dijkstra algorithm.

Figure 1:
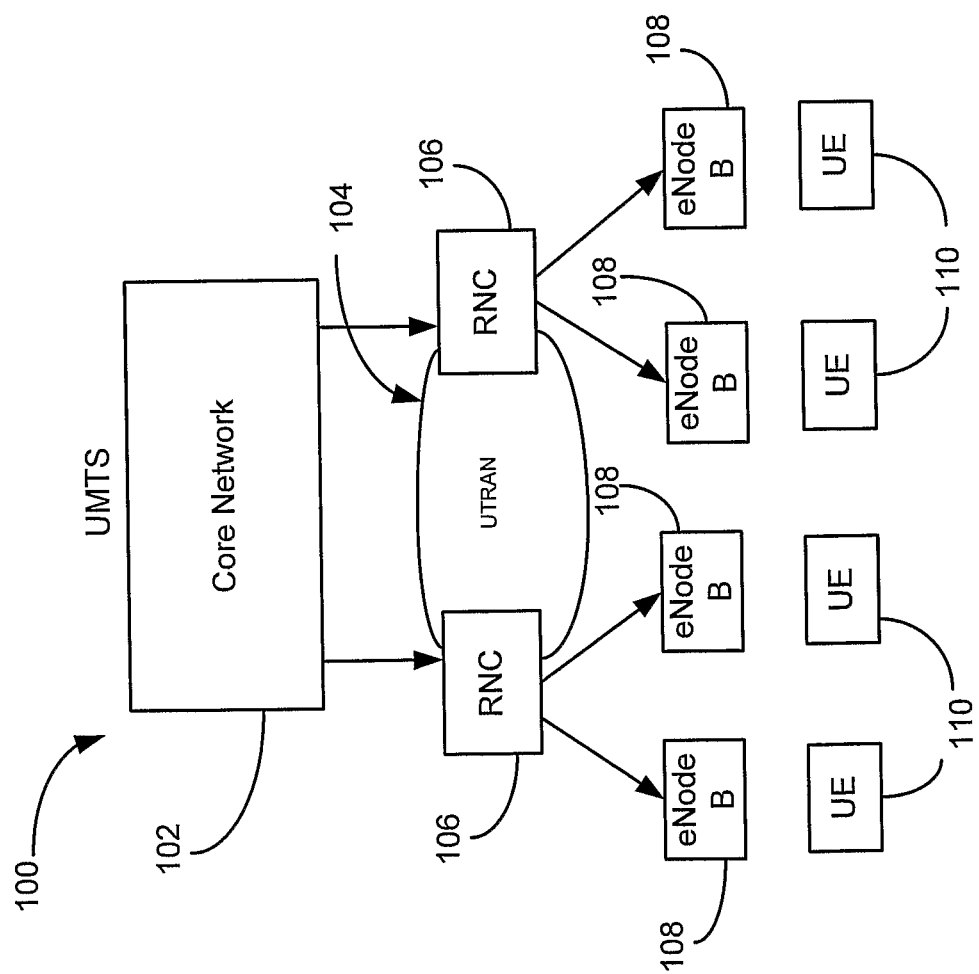
FIG. 1 (prior art) illustrates a simplified block diagram of an exemplary Universal Mobile Telecommunications Systems network.

FIG. 1 illustrates a simplified block diagram of an exemplary Universal Mobile Telecommunications Systems (UMTS) network 100 that comprises a $3^{rd}$ Generation (3G) network referred to as a core network 102 and a UMTS Terrestrial Radio Access Network (UTRAN) 104. The UTRAN comprises a plurality of Radio Networks Controllers (RNCs) 106. In addition, there is a plurality of RNCs performing various roles. Each RNC is connected to a set of base stations. A base station is often called an eNodeB. Each eNodeB 108 is responsible for communication with one or more User Equipments (UEs) 110 within a given geographical cell. The serving RNC is responsible for routing user and signaling data between an eNodeB and the core network. FIG. 1 illustrates a network which may be utilized in the present invention. However, the present invention may be implemented on any packet-switched network and is not limited to the network configuration illustrated in FIG. 1.

Figure 2:
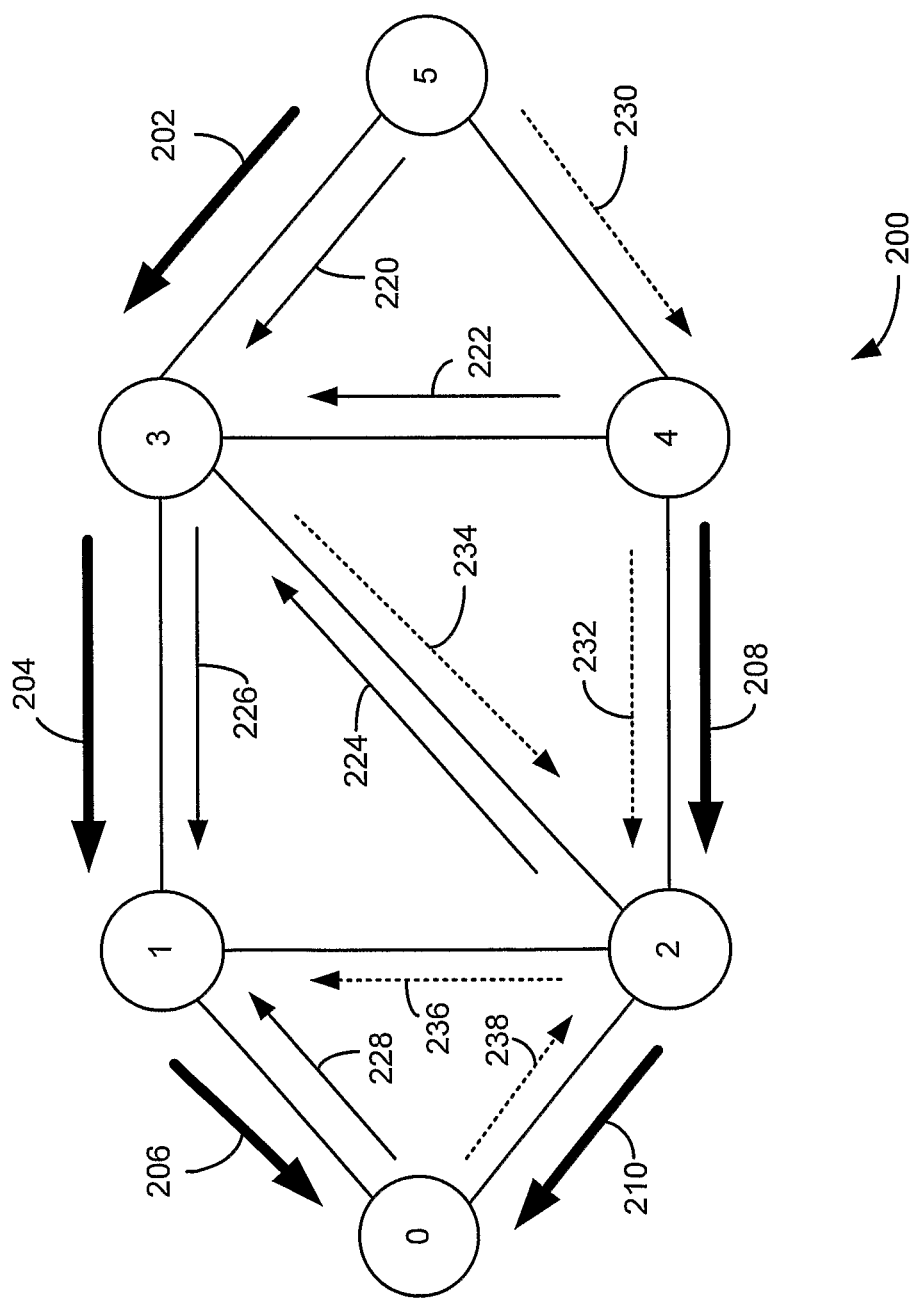
FIG. 2 is a simplified diagram illustrating the pathways for transmitting packets in a system in an embodiment of the present invention.

FIG. 2 is a simplified diagram illustrating the pathways for transmitting packets in a system 200 in an embodiment of the present invention. The system 200 includes a plurality of nodes 0, 1, 2, 3, 4, and 5. Pathways 202, 204, 206, 208, and 210 illustrate the shortest path tree to the node 0. Pathways 220, 222, 224, 226, and 228 illustrate the primary redundant tree rooted at node 1. Pathways 230, 232, 234, 236, and 238 illustrate the second redundant tree rooted at node 1. As depicted in FIG. 2, if there are no failure in the network, node 5 sends packets to node 0 on a sequential path through nodes 5-3-1-0. However, if node 3 fails, node 5, a neighbor of node 3, detects the failure and tries to send the packet to the next-next hop (i.e., node 1) in an IP-in-IP tunnel. To forward this packet, node 5 first tries to utilize the primary redundant tree, but determines that it is also failed. However, the network may utilize the secondary redundant tree. Thus, node 5 sends the packet to node 4 via pathway 230. Node 4 detects that the packet is on the secondary redundant tree of node 1 from the destination address, so node 4 then tries to forward the packet on the same secondary redundant tree by sending the packet to node 2. Node 2 then forwards the packet to node 1 via pathway 236, where the packet exits the tunnel and is sent to node 0 on the original shortest path via pathway 206. If the secondary redundant tree also fails, in which case there are two failures, the packet is dropped.

As discussed above, the shortest paths are utilized as the default paths in a similar manner as the existing Not-via methodology. However, if there is a failure in a node or a link in the network, the node is placed in a tunnel with a special IP address. By utilizing this special address, a packet can avoid the failure. The packet may then exit the tunnel on the other side of the failure (i.e., at the next-next hop).

However, the pathways are computed in a different way than existing Not-via systems. The present invention utilizes maximally redundant trees for forwarding if the packet must detour around a failed node or link. Additionally, by utilizing these redundant trees, the use of numerous IP addresses is avoided since one pair of redundant trees can protect multiple resources.

In two-node-connected networks, a pair of redundant trees routed at each node is determined. One of the redundant trees is designated the primary tree and the other tree is designated the secondary tree. If there is no failure, packets follow the shortest path. If there is a failure in the network, the next-next hop remains reachable by following one of the two redundant trees. If it is possible, the packet is forwarded by following the primary tree rooted at the next-next hop. If it is not possible to forward the packet via the primary tree, the packet is forwarded via the secondary tree. If a packet using the secondary path cannot be forwarded, then the packet is dropped as there must be at least two failures in the network. With implementation of the present invention, the packets will reach the destination, even if there is one node or one link failure. Furthermore, no loops can be formed because if a packet cannot be forwarded using the primary or secondary tree, the packet is simply dropped.

Figure 3B:
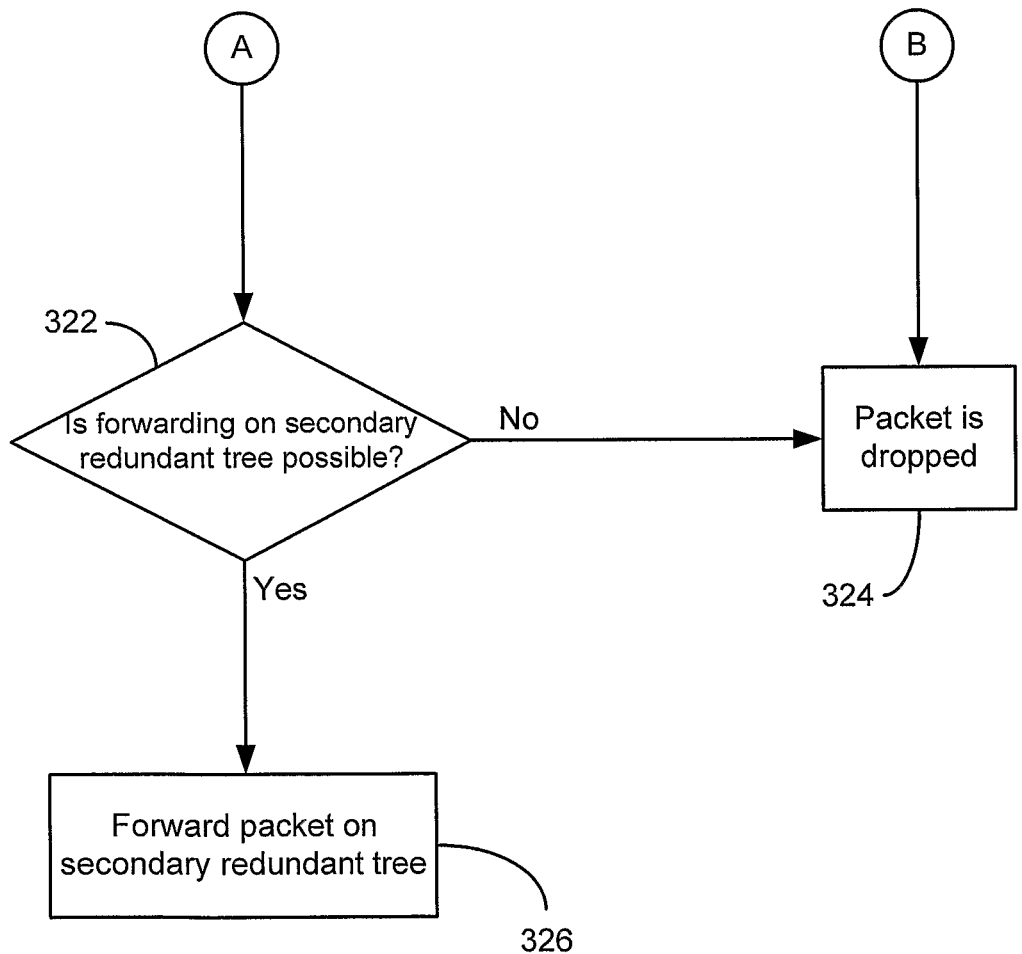

FIGS. 3A and 3B are flowcharts illustrating the steps of forwarding a packet where a node or link failure occurs in a network according to the teachings of the present invention. With reference to FIGS. 1-3, the steps of the method will now be explained. In step 300, a packet is transported through the network 100 to a node. In step 302, it is determined if the node is the destination of the packet. If it is determined in step 302 that the node is the destination, it is determined if the packet is tunnelled in step 304. If it is determined in step 304 that the packet is tunnelled, the packet exits the tunnel at the destination node in step 306. However, in step 304, if it is determined that the packet is not tunnelled, the packet is processed normally in step 308.

In step 302, if it is determined that the node is not the destination, it is determined in step 310 if the address of the packet is a normal address. If it is determined that the address of the packet is a normal address, it is determined if the packet is forwarded on the shortest path possible in step 312. If it is determined that the packet is forwarded on the shortest path possible, the packet is then forwarded on the shortest path in step 314. However, if it is determined that the packet is not forwarded on the shortest path possible, it is then determined if it is possible to forward the packet on a primary redundant tree in step 316. If it is determined that it is possible to forward the packet on a primary redundant tree, the packet is forwarded on the primary redundant tree in step 318. If the packet is not tunnelled, the packet is dropped.

In step 310, if the address of the packet is not a normal address, it is determined if the packet is addressed on a primary redundant tree in step 320. If it is determined that the address of the packet is on a primary redundant tree, it is determined if it is possible to forward the packet on a primary redundant tree in step 316. If it is determined that it is possible to forward the packet on a primary redundant tree, the packet is forwarded on the primarily redundant tree in step 318. If the packet is not tunnelled, the packet is dropped.

In step 320, if it is determined that the packet is not addressed on a primary redundant tree, it is determined if it is possible to forward the packet on a secondary redundant tree in step 322. If it is determined that it is not possible to forward the packet on the secondary redundant tree, the packet is dropped in step 324.

In step 322, if it is determined that the packet can be forwarded on a secondary redundant route, the packet is forwarded on the secondary redundant tree in step 326. If the packet is not tunnelled, the packet is put in a tunnel. Additionally, if necessary, the address of the packet is changed to a tunnelled address.

The present invention does not require any modification to existing forwarding engines. In the present invention, three directed trees are needed for each node as a root. The first tree is a shortest path tree. The second and third trees are the two redundant trees. Preferably, the same trees at each node are utilized, which is possible if all the nodes use the same topology. In some cases, when the algorithm finding a pair of redundant trees is not fully defined, more than one edge node may be chosen. However, priorities at nodes (for example, their loopback IP address can be such a priority) may be utilized to avoid problems encountered where there is more than one node to choose.

In the present invention, addresses used for resilience are preferably distinguished from normal addresses. The original Not-via has the same problem, but it is easy to solve, since addresses for resilience are only used in the transport network. Thus, even private IP addresses may be used. In this way, three addresses are assigned to each node. First, packets having a normal address as a destination are forwarded on the shortest path. Second, packets having the first detour address use the primary redundant tree. Third, packets having the second detour address use the second redundant tree. Private IP addresses may be used for the two detour addresses (i.e., primary redundant tree and secondary redundant tree). It should be understood that only three addresses per node are necessary, but more than three addresses may still be used and remain in the scope of the present invention. The present invention may be utilized in point-to-point networks with ring topology. In most cases, the present invention does not need any new addresses at all. Normally, all the routers have a loopback address and at least two interfaces, all having their own address. Thus, two of the interface addresses may be used as detour addresses. In such a scenario, the routers are preferably addressed by their loopback addresses, otherwise packets heading to the routers as destination (not the transported traffic) would not have fast reroute.

In existing Not-via solutions, other problems are encountered for networks containing LANs. Specifically, the capability of avoiding failures in these networks significantly increases the number of IP addresses needed. On the other hand, in the present invention, redundant trees are utilized. Thus, LANs may be simply represented by a node of the graph on which the trees are computed. If a node representing a LAN fails, the node may be easily avoided using one of the two redundant trees. Furthermore, if a node connected to the LAN fails, one of the redundant trees remains connected.

Since it is not necessary to assign any IP address to LANs because the LANs cannot be destinations, the present invention does not need an increase in the number of addresses.

With the present invention, many of the primary problems with existing Not-via addresses are eliminated. The number of IP addresses is significantly reduced while the number of addresses is scaled linearly to the number of nodes. Thus, the time needed to download the computed paths to the line cards also decreases because of the use of a lower number of addresses. Furthermore, using redundant trees also eliminates numerous special cases utilized in existing Not-via systems.

In the present invention, to determine the redundant trees, an effective algorithm is necessary. Various algorithms may be utilized to find the redundant trees. For example, the redundant trees rooted at each node may be computed one node at a time, which would take the time of n (the number of nodes) redundant tree computation. On the other hand, knowing that whole redundant trees are not needed by any of the nodes in the network, the nodes only need to know the next hops toward each root on both of the trees, which opens the possibility of a faster algorithm. By using such an implementation, computational complexity is also reduced to the complexity of a single run of a Dijkstra's algorithm.

The present invention may also be implemented in not-two-node-connected networks. Although it is not possible for not-two-node-connected networks to find a pair of redundant trees, the network may still find maximally redundant trees even in these graphs. A pair of maximum redundant trees is a generalization of redundant trees. If a pair of maximum redundant trees is given, their root node is reachable using any of the trees. If the original graph was a 'two-node-connected', then a pair of maximum redundant trees is a pair of redundant trees. Finding such trees may be accomplished in linear time. These trees can then be used to find the next hops of multiple trees.

The present invention may also be implemented in multiple-node-connected networks. In an n-edge-connected network (n>2), the network is a two-node-connected as well, so the two redundant trees may still be found. If a link or node fails, it is possible to avoid the failure. Thus, the network may still transport the traffic and all the nodes with sufficient time to recognize the error. When all the nodes know the new topology, the complete routing may be recomputed with rerouting as well.

The present invention may be utilized in any packet switched network and is not limited to an IP network. The present invention provides a fast reroute capability. The system employs maximally redundant trees as detours in case of failures. The determination of a detour is provided by the destination address of the packet. Furthermore, if a packet cannot be forwarded using the default shortest path, the system may utilize a tunnel to transmit the packet. The present invention does not require any new protocols as the existing link state routing protocols may be used.

The present invention provides many advantages over exiting Not-via solutions. The present invention provides a very fast local reroute capability in IP networks. The present invention provides a protection to all links and nodes. Furthermore, loops are avoided since a packet is discarded if more than one failure is detected. The present invention still utilizes the shortest path as a default. The present invention significantly decreases the time needed to compute the new paths and download the new paths to the line cards.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of routing packets in a telecommunications network between a first node and a destination node, the method comprising the steps of:
   determining a next hop in a shortest path between the first node and the destination node;
   computing a first maximally redundant tree and a second maximally redundant tree between the first node and the destination node, each of the first maximally redundant tree and the second maximally redundant tree providing an alternative path between the first node and the destination node, each alternative path sharing a minimal number of nodes with the other alternative path;
   detecting if a failure exists between the first node and the destination node; and
   if no failure exists, forwarding the packet along the shortest path between the first node and the destination node;
   if a failure exists, forwarding the packet via the first maximally redundant tree after encapsulating the packet using a first loopback address, the first loopback address identifying the destination node and identifying the first maximally redundant tree as the active forwarding tree;
   if a failure exists and the first maximally redundant tree is not available, forwarding the packet via the second maximally redundant tree after encapsulating the packet using a second loopback address, the second loopback address identifying the destination node and designating the second maximally redundant tree as the active forwarding tree; and
   further comprising the step of calculating next-hops only in either the first maximally redundant tree or the second maximally redundant tree instead of calculating a complete routing of the first maximally redundant tree or a complete routing of the second maximally redundant tree.

2. The method according to claim 1, wherein the method further comprises, upon determining that a failure exists and the first maximally redundant tree and the second redundant trees are not available, dropping the packet.

3. A system for routing packets in a telecommunications network, the system comprising:
   a first node for transmitting a packet;
   a destination node for receiving the packet;
   the first node comprising:
     a memory; and
     a processor, wherein said processor, upon executing instructions stored in the memory, is operative to:
       determine a next hop in a shortest path between the first node and the destination node;
       compute a first maximally redundant tree and a second maximally redundant tree between the first node and the destination node, the first and second maximally redundant trees each providing an alternative path between the first node and the destination node, each alternative path sharing a minimal number of nodes with the other alternative path;
       detect if a failure exists between the first node and the destination node, wherein if no failure exists, forward the packet along the shortest path between the first node and the destination node;
       if a failure exists, forward the packet via the first maximally redundant tree after encapsulating the packet using a first loopback address, the first loopback address identifying the destination node and identifying the first maximally redundant tree as the active forwarding tree;

if a failure exists and the first maximally redundant tree is not available, forward the packet via the second maximally redundant tree after encapsulating the packet using a second loopback address, the second loopback address identifying the destination node and designating the second maximally redundant tree as the active forwarding tree; and wherein the processor is further operative to calculate next-hops for either the first maximally redundant tree or the second maximally tree, instead of calculating a complete routing of the first maximally redundant tree or a complete routing of the second maximally redundant tree.

4. The system according to claim 3, wherein if it is determined that a failure exists and the first maximally redundant tree and the second maximally redundant trees are not available, the packet is dropped.

5. A node for routing packets in a telecommunications network from the node to a destination node, the node comprising:

a memory; and a processor, wherein said processor, upon executing instructions stored in the memory, is operative to:

determine a next hop in a shortest path between the node and the destination node;

compute a first maximally redundant tree and a second maximally redundant tree between the node and the destination node, the first and second maximally redundant trees each providing an alternative path between the node and the destination node, each alternative path sharing a minimal number of nodes with the other alternative path;

detect if a failure exists between the node and the destination node, wherein if no failure exists, forward the packet along the shortest path between the node and the destination node, if a failure exists, forward the packet via the first maximally redundant tree after encapsulating the packet using a first loopback address, the first loopback address identifying the destination node and identifying the first maximally redundant tree as the active forwarding tree, and if the packet cannot be forwarded via the first maximally redundant tree, forward the packet via the second maximally redundant tree after encapsulating the packet using a second loopback address, the second loopback address identifying the destination node and designating the second maximally redundant tree as the active forwarding tree; and wherein the processor is further operative to calculate next-hops for either the first maximally redundant tree or the second maximally redundant tree, instead of calculating a complete routing of the first maximally redundant tree or a complete routing of the second maximally redundant tree.

6. The node according to claim 5, wherein if it is determined that a failure exists and the first maximally redundant tree and the second maximally redundant tree are not available, the packet is dropped.

* * * * *